SERVO SYSTEM FOR MAGNETIC TAPE MACHINE

Filed Aug. 22, 1960 6 Sheets-Sheet 1

INVENTORS
Robert E. Young
Robert A. Payne
BY Dome, McDougall, Williams and Hersh
Attorneys INVENTORS
Robert E. Young
BY Robert A. Payne
Ooms, McDougall, Williams & Hersh
Attorneys

SERVO SYSTEM FOR MAGNETIC TAPE MACHINE

Filed Aug. 22, 1960 6 Sheets-Sheet 3

INVENTORS
Robert E. Young
BY Robert A. Payne
Ooms, McDougall, Williams & Hersh
Attorneys INVENTORS
Robert E. Young
Robert A. Payne
BY Ooms, McDougall, Williams & Hersh
Attorneys INVENTORS
Robert E. Young
Robert A. Payne
by Dorna, McDougall, Williams & Hersh
Attorneys

SERVO SYSTEM FOR MAGNETIC TAPE MACHINE

Filed Aug. 22, 1960 6 Sheets-Sheet 6

INVENTORS
Robert E. Young
Robert A. Payne
BY Oems, McDougall,
Williams & Hersh
Attorneys United States Patent Office 3,105,179

Patented Sept. 24, 1963

3,105,179

SERVO SYSTEM FOR MAGNETIC TAPE MACHINE

Robert E. Young, Clarendon Hills, and Robert A. Payne, Des Plaines, Ill., assignors to Cook Electric Company, Chicago, Ill., a corporation of Delaware Filed Aug. 22, 1960, Ser. No. 50,928
10 Claims. (Cl. 318—6)

This invention relates to magnetic tape machines, or other similar machines in which a long web or strip is pulled through the machine and then wound on a takeup reel.

One object of the present invention is to provide a new and improved system for driving the take-up reel in a controlled manner, so as to minimize variations in the tension on the tape.

A further object is to provide a new and improved servo system for controlling the torque developed by the takeup reel motor so as to maintain substantially constant tension in the tape, even if the tape is moved in an intermittent manner through the machine, with rapid starts and stops.

It is another object to provide a new and improved system of the foregoing character which is extremely precise and rapid in operation.

A further object is to provide such a new and improved servo system which requires very little operating power and is extremely compact.

Further objects and advantages of the present invention will appear from the following description, taken with the accompanying drawings, in which.

Figure 2:
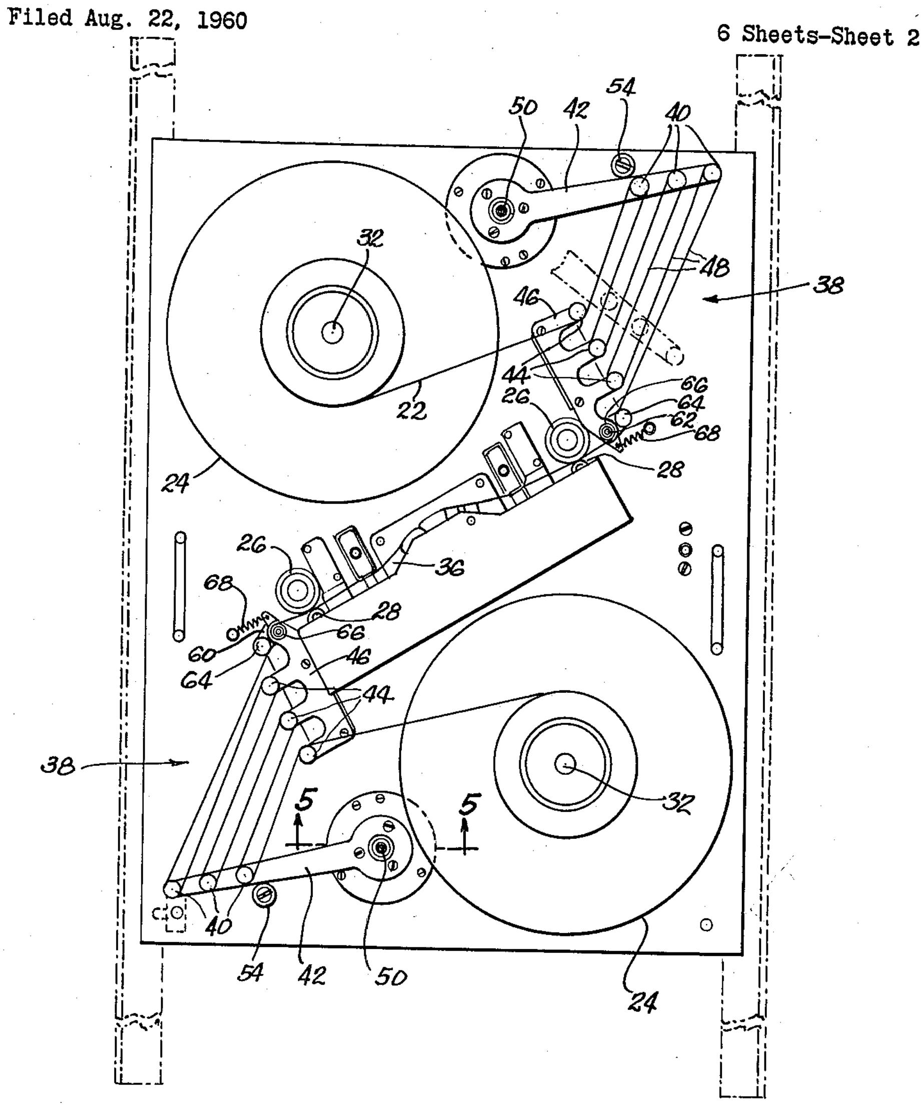
FIG. 2 is an elevational view showing the front of a magnetic tape machine with which the servo system may be employed.
Figure 3:
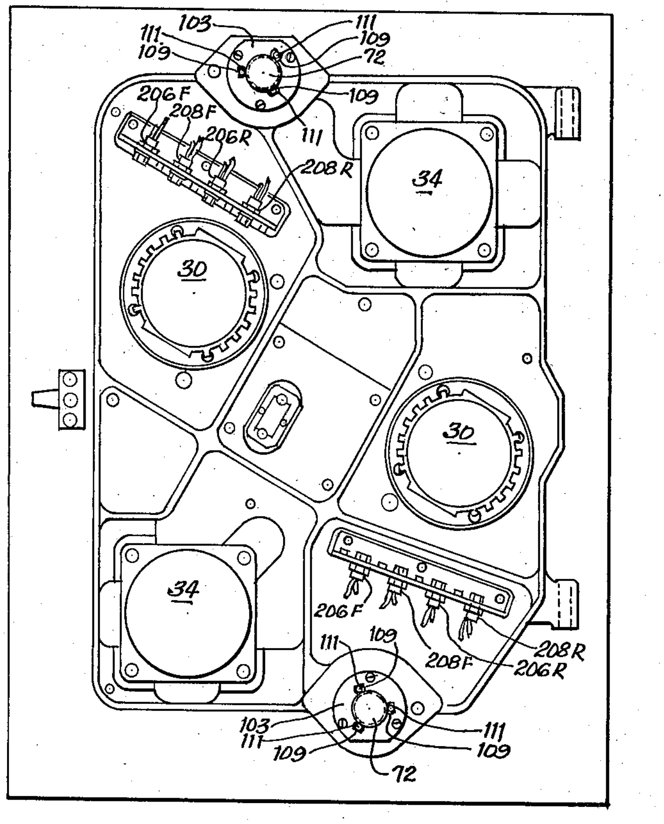
FIG. 3 is a rear view of the magnetic tape machine.

An embodiment of the invention will be described with reference to a magnetic tape machine 20, shown generally in FIGS. 2 and 3, while it will be understood that the invention is applicable to various machines in which an elongated tape or web is pulled through the machine and wound onto a reel. The illustrated machine 20 is adapted to transport a magnetic tape 22 between two reels 24. The machine is reversible so that the tape may be unwound from either reel and wound onto the other reel. The tape 22 is pulled through the machine by two capstans 26, one of which is adapted to pull the tape forward while the other is adapted to pull the tape in reverse. Two pressure rollers 28 are provided for pressing the tape against the respective capstans 26. As shown to advantage in FIG. 3, the capstan 26 is provided with a separate drive motor 30. Each reel 24 is mounted on a shaft 32 which is provided with a separate drive motor 34. Between the capstans 26 the tape 22 passes through one or more heads 36 which may be adapted to read signals from the tape, record signals on the tape, or both.

The general purpose of the present invention is to regulate the torque of the reel drive motors 34 so that the tape will be taken up in a smooth continuous manner, with a minimum of variation in the tension on the tape. For some applications, the tape is driven intermittently by the capstans 26, with rapid starts and stops. Of course, a rapid stop in the movement of the tape tends to increase the tension in the tape between the takeup reel and the adjacent capstan. If this effect is not controlled, the tape may be stretched or broken. A rapid start in the movement of the tape may tend to cause slack or unduly low tension to develop in the tape.

As a step toward maintaining relatively constant tension in the tape, the machine is provided with a pair of tension regulating devices or mechanisms 38 which maintain tension on the tape between each reel 24 and the corresponding capstan 26. Moreover, the tension regulators 38 provide variable storage of the tape in transit between each capstan and the corresponding reel, so that the tape will not be broken by the inertia of the reel if the tape is stopped abruptly. It will be seen that each tension regulator 38 comprises a series of parallel rollers or guides 40 which are mounted on a movable control member in the form of a swingable dancer arm 42. The rollers 40 are movable into meshing relation with a series of stationary rollers or pins 44, mounted on a generally comb-shaped bracket 46. It will be seen that the tape is threaded back and forth between the rollers 40 and 44 in a plurality of flights 48 which are variable in length, according to the position of the dancer arm 42.

Figure 5:
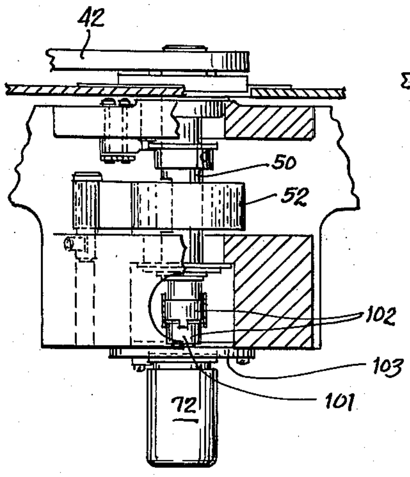
FIG. 5 is a fragmentary enlarged cross-sectional view, taken generally along a line 5—5 in FIG. 2.

To maintain tension on the tape, the dancer arm 42 is mounted on a shaft 50 which is biased in a counterclockwise direction by a spring 52 (FIG. 5). In order to provide a very low spring rate, the illustrated spring 52 is in the form of a helically coiled spring, similar to a clock spring. Thus, the tension exerted by the spring changes very little throughout the normal range of movement of the dancer arm. When the machine is idle, the spring holds the dancer arm 42 against a fixed stop 54. When the machine is operating, the tension on the tape 22 pulls the arm 42 in a clockwise direction, toward the stationary rollers 44. Thus, the arm 42 may swing or dance about a position such as the one illustrated in broken lines in FIG. 2.

Each of the tension regulators 38 also comprises a second dancer arm 60 of small size and extremely low inertia for taking up rapid variations in tape tension, such as may occur when the tape is stopped abruptly. The dancer arm 60 is swingable about a pivot 62. It will be seen that the tape is threaded around a roller or pin 64 on the dancer arm 60, and also around a stationary roller or pin 66, which is coaxial with the pivot 62. A spring 68 biases the dancer arm 60 counterclockwise so as to maintain an inflection in the tape as it passes around the rollers 64 and 66. Any sudden increase in the tension in the tape will tend to swing the dancer arm 60 in a clockwise direction against the biasing action of the spring 68. In this way, the shock on the tape will be reduced.

Figure 1:
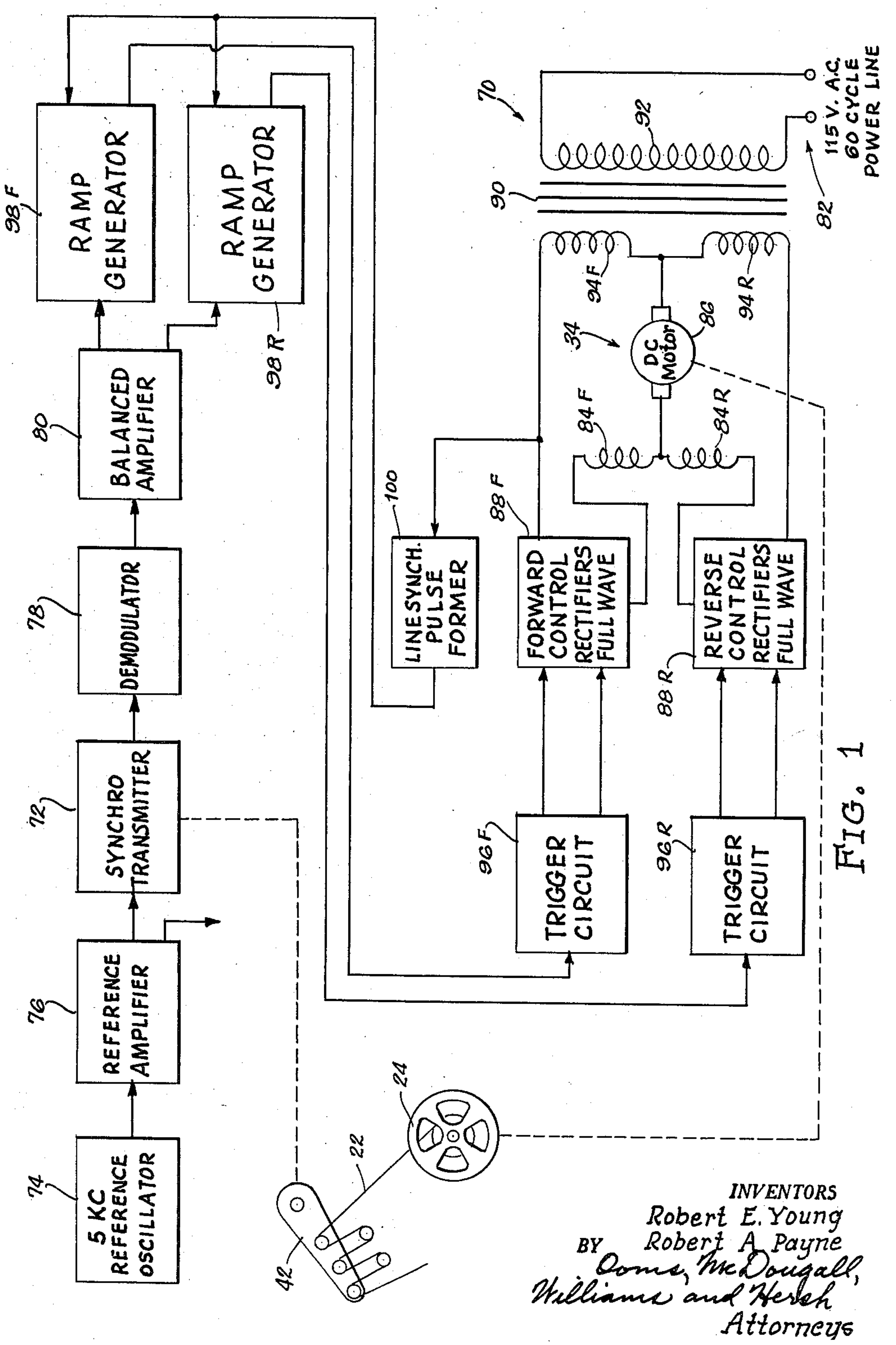
FIG. 1 is a block diagram illustrating a servo system to be described as an illustrative embodiment of the present invention.

FIG. 1 is a block diagram of a servo system 70 adapted to regulate the torque developed by each of the reel drive motors 34 so as to minimize variations in the tension in the tape. Of course, there are two servo systems, one for each of the reel drive motors 34. Each servo system is controlled by the corresponding dancer arm 42, so that the arm tends to be maintained near a predetermined intermediate or null position, which may correspond to the position shown in broken lines in FIG. 2. Of course, any change in the tape tension causes the dancer arm 42 to change its position, but the servo system regulates the torque of the motor in such a manner that the dancer arm tends to return to its former position.

The servo system 70 comprises a device 72 to provide a signal which is indicative of the position of the dancer arm 42. Preferably, such signal passes through a null at an intermediate position representing approximately the position to be maintained by the dancer arm 42. At the null, the signal preferably experiences a reversal in polarity or phase. In the illustrated embodiment, the device 72 preferably takes the form of a synchro-transmitter or generator. Those skilled in the art will be familiar with the construction of such synchros. In the illustrated system, a reference oscillator 74 is provided to generate a reference or carrier signal for energizing the synchro 72. The reference signal may be at five kilocycles or any other suitable frequency. In this case, the frequency of five kilocycles was chosen because it is much higher than the sixty cycle frequency of the alternating power current employed to operate the reel drive motors 34. The use of a high reference frequency makes it possible for the system to respond very rapidly. The reference signal is amplified by a reference amplifier 76 and then is fed to the synchro 72. The synchros of both servo systems, for the two reel motors, may be driven from the amplifier 76.

The output of the synchro 72 is fed to a polarity sensitive demodulator 78 which provides a direct current output signal corresponding in magnitude and polarity to the position of the dancer arm relative to the null position. Thus, the output of the demodulator 78 passes through a null when the dancer arm 42 moves through its null or neutral position. When the arm is on one side of the null, the output signal from the demodulator 78 will be positive in polarity. On the other side of the null, the output signal is negative.

The output signal from the demodulator 78 is fed to a direct current amplifier 80 which may be of the balanced type. It is preferred that the amplifier 80 be of the operational type, whose output is responsive not only to the magnitude of the input signal, but also to the rate of change of the input signal. Thus, the amplifier 80 has a differentiating action as well as an amplifying action. This increases the rapidity with which the synchro system responds to variations in tape tension. Moreover, the differentiating action tends to suppress any sustained oscillation that might otherwise develop in the servo system.

Figure 7:
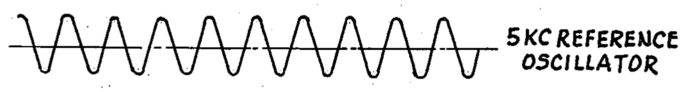
FIGS. 7–17 are diagrams illustrating the wave forms of the signals at various points in the servo system.
Figure 8:
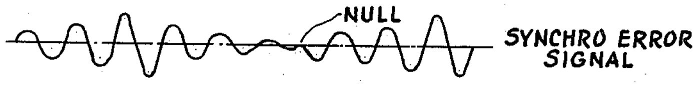
Figure 9:
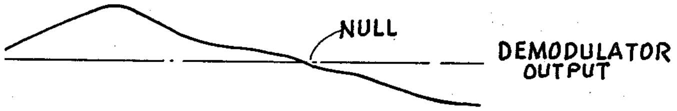
Figure 10:
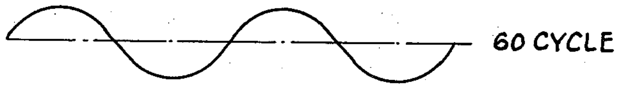
Figure 11:
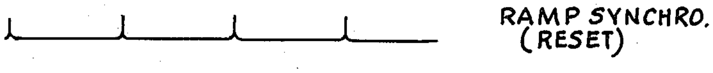

FIG. 7 illustrates the wave form of the signal from the reference oscillator 74. It will be seen that the wave form is substantially sinusoidal. FIG. 8 illustrates the wave form of the error signal from the synchro 72, as the dancer arm 42 passes through its null position. It will be seen that the phase of the error signal reverses, or changes by 180 degrees, as the signal passes through the null. The corresponding output signal from the demodulator 78 is shown in FIG. 9. It will be noted that the direct current signal reverses in polarity as the null is passed.

As already indicated, the reel drive motor 34 is operated by power derived from an ordinary alternating current power line 82, which may supply alternating current at 115 volts and 60 cycles, or any other suitable voltage and frequency. It is preferred that the motor 34 be of the direct current type and that it be supplied with rectified current derived from the alternating current power line.

The motor 34 may have two opposed field coils 84F and 84R, one to produce forward torque, and the other reverse torque. The motor 34 has an armature 86 which is connected in series with both field coils, so that the total current through the field coils flows through the armature.

The currents through the field coils 84F and 84R may be controlled in a variety of ways, preferably by means of forward and reverse control rectifiers 88F and 88R, which may be arranged in a full wave circuit. The rectifiers 88F and 88R may comprise Thyratrons or other gaseous discharge tubes, but preferably they comprise solid state rectifiers of the control type.

Power to energize the motor 34 is supplied by a transformer 90 having a primary winding 92 and two secondary windings 94F and 94R. The primary winding 92 is connected to the power line 82. It will be seen that the motor armature 86 is connected between the junction of the field coils 84F and 84R and the junction of the secondary windings 94F and 94R.

The current through the rectifiers 88F and 88R is controlled by supplying them with signals of variable phase, in a manner that will be familiar to those skilled in the art. The variable phase control signals are synchronized in frequency with the alternating current from the power line 82.

The control signals of variable phase may be supplied by trigger circuits 96F and 96R which are responsive to signals from variable ramp generators 98F and 98R. The ramp generators are controlled by signals from the balanced amplifier 80 and are synchronized with the alternating current line by signals from a synchronizing pulse generator 100. It will be understood that the ramp generators and the trigger circuits constitute means adapted to generate signals which vary in phase in accordance with the output from the balanced amplifier 80 so that the forward and reverse currents supplied to the motor will be regulated in accordance with the position of the dancer arm 42. When excessive tension shifts the dancer arm in one direction, the forward torque of the motor 34 will be reduced, so as to reduce the tension in the tape. Conversely, insufficient tension in the tape will permit the dancer arm to move in the opposite direction. This will increase the forward torque of the motor 34 so as to increase the tension.

Figure 4:
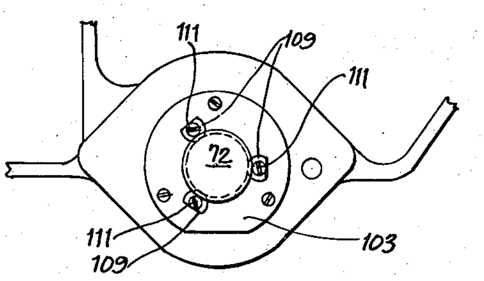
FIG. 4 is an enlarged detail corresponding to a portion of FIG. 3.

As shown in FIG. 5, the synchro 72 has a shaft or rotor 101 which is connected to the dancer arm shaft 50 by a suitable coupling 102. The synchro 72 is adjustably mounted on a stationary plate 103 by means of a plurality of clamps 109, secured to the plate by screws 111 (FIG. 4). If the clamps 109 are loosened the synchro 72 may be turned about its axis so as to adjust the null position of the dancer arm 42.

Figure 6A:
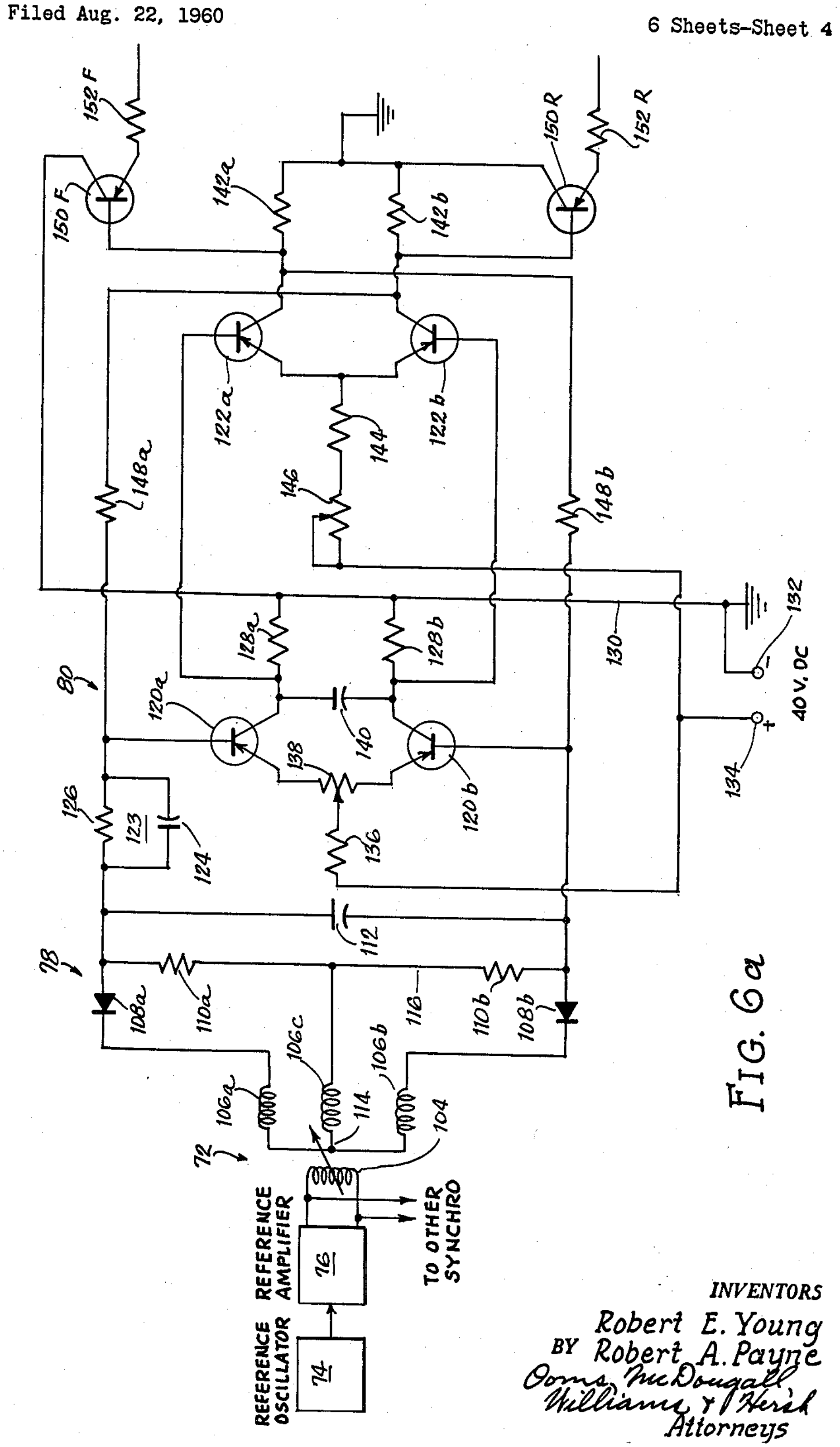
FIG. 6 is a general circuit diagram of the servo system, this being divided into two portions, designated FIGS. 6*a* and 6*b* for convenience of illustration.
Figure 6B:
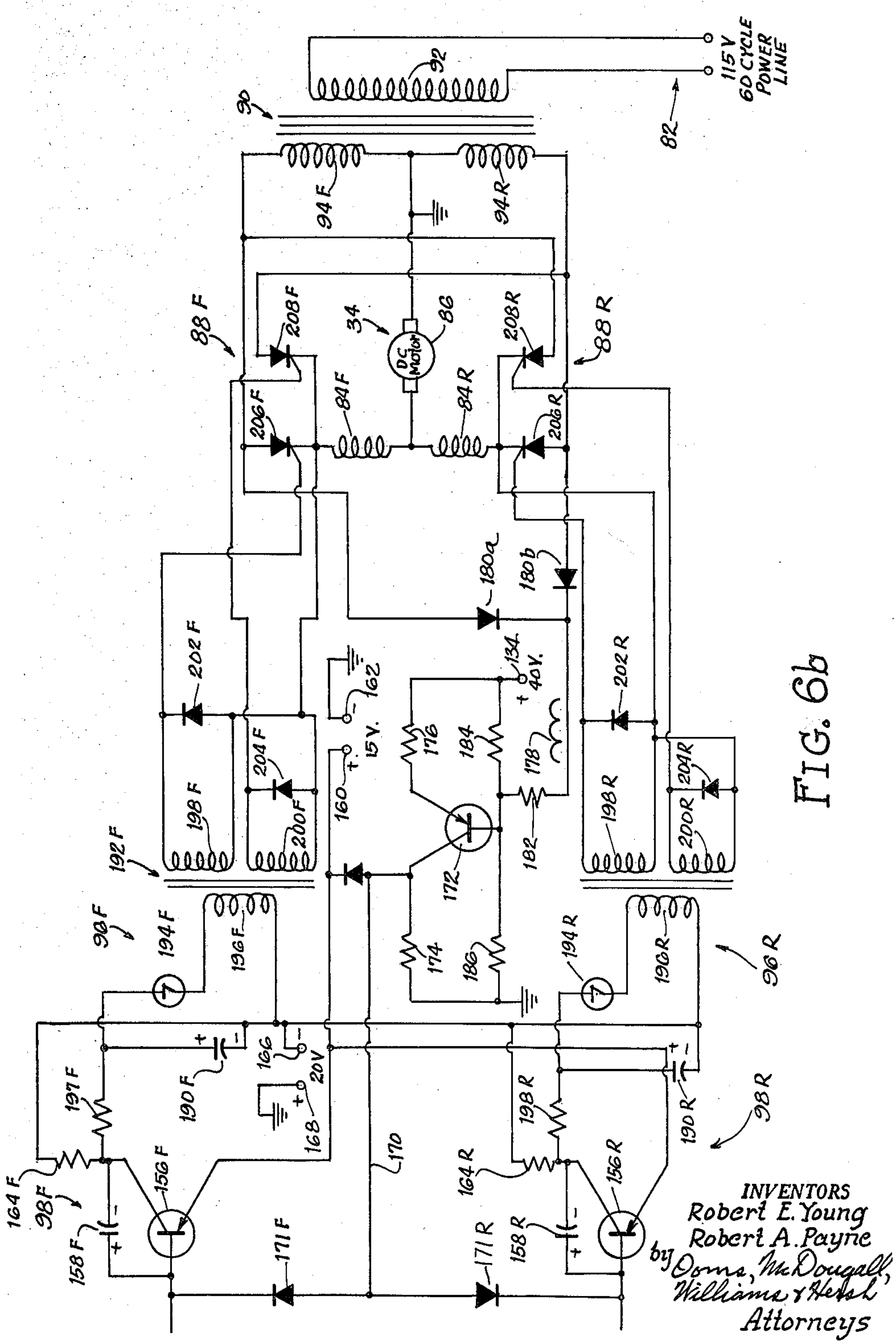
Figure 18:
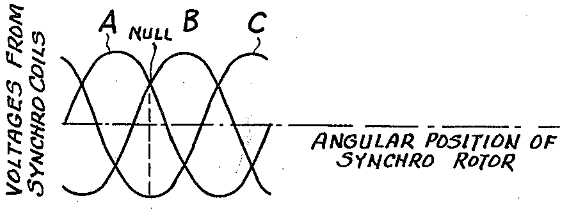
FIG. 18 is a graph illustrating the operation of the synchro-transmitter employed in the servo system.

As indicated in FIG. 6, the synchro 72 may be of the type having a primary coil 104 and three secondary coils 106*a*, 106*b* and 106*c*. The primary coil and the secondary coil assembly may be rotatable, relative to each other, in response to swinging movement of the dancer arm 42. The secondary coils 106*a*, 106*b* and 106*c* may be spaced apart from each other, at three different angles to the primary coil 104. The primary coil 104 is preferably mounted on the rotor 101, while the secondary coils are preferably stationary or stator coils. The general action of the synchro is illustrated in FIG. 18 which is a graph of the voltages from the synchro stator coils, plotted as functions of the angular position of the synchro rotor. The voltages from the three coils are designated A, B and C in FIG. 18. In each case, the voltage developed by the coil varies as a sine function of the position of the synchro rotor. Due to the spacing between the coils, the graphs are shifted or staggered relative to one another along the horizontal axis. At one position of the synchro rotor, the voltages from the A and B coils are equal and in the same direction, while the voltage from the C coil is at a maximum and in the opposite direction. This position of the synchro rotor may be employed as the null and is so designated in FIG. 18.

With this arrangement of the synchro, the demodulator 78 may be arranged to derive an output voltage corresponding to the folowing quantity:

$$(A+C)-(B+C)$$

It will be noted that the voltage from the C coil cancels out, so that the demodulator effectively produces a signal corresponding to the difference between the A and B voltages. The C voltage is introduced because it facilitates the discrimination between the phases of the A and B voltage, so that the voltage output from the discriminator will change in polarity as the dancer arm passes through its null position.

As shown in FIG. 6, the demodulator 78 may comprise a pair of diodes 108*a* and 108*b*, a pair of load resistors 110*a* and 110*b*, and a filtering capacitor 112. It will be seen that one side of each of the coils 106*a*, 106*b* and 106*c* is connected to a common junction lead 114. The diode 108*a* and the resistor 110*a* are connected in series with the coil 106*a*. Similarly, the diode 108*b* and the resistor 110*b* are connected in series with the coil 106*b*. The other side of the coil 106*c* is connected to a junction lead 116 which extends between the resistors 110*a* and 110*b*. The capacitor 112 is connected across the output circuit of the demodulator, comprising the resistors 110*a* and 110*b* in series.

It will be noted that both of the diodes 108*a* and 108*b* are connected to deliver negative output voltage. Thus, the diodes are in opposition. If the voltages from the diodes are equal, the output from the demodulator will be zero. This is the condition at the null position of the dancer arm 72. If the voltage from the diode 108*a* predominates, the output of the demodulator will be negative. If the output voltage from the diode 108*b* predominates, the output of the demodulator will be positive.

The balanced amplifier 80 comprises two stages of transistors connected in push-pull. Thus, the amplifier 80 is provided with four transistors 120*a*, 120*b*, 122*a*, and 122*b*. The demodulator output voltage across the capacitor 112 is applied between the bases of the transistors 120*a* and 120*b*. A phase shifting impedance or network 123 is connected between one side of the capacitor 112 and the base of the transistor 120*a*. The illustrated network 123 comprises a capacitor 124 in parallel with a resistor 126.

Output resistors 128*a* and 128*b* are connected between the collectors of the respective transistors 120*a* and 120*b* and a ground lead 130, which is also connected to the negative terminal 132 of a 40 volt direct current power supply. The positive terminal 134 of the power supply is connected to the emitters of the transistors 120*a* and 120*b* through a series biasing resistor 136 and a balancing potentiometer 138. It will be seen that ends of the potentiometer 138 are connected to the emitters, while the slider is connected to the positive terminal 134 through the resistor 136. A filtering capacitor 140 may be connected across the output of the first stage, between the collectors of the transistors 120*a* and 120*b*.

The output across the capacitor 140 is connected to the bases of the second stage transistors 122*a* and 122*b*. Here again, output resistors 142*a* and 142*b* are connected between the ground lead 130 and the collectors of the respective transistors 122*a*. A fixed biasing resistor 144 and a variable biasing resistor 146 are connected in series between the positive power supply terminal 134 and the emitters of the transistors 122*a*.

Negative feedback is provided by resistors 148*a* and 148*b* connected between the output of the second stage transistors 122*a* and 122*b* and the input of the first stage transistors 120*a* and 120*b*. Thus, the resistor 148*a* is connected between the base of the transistor 120*a* and the collector of the transistor 122*b*. Similarly, the resistor 148*b* is connected between the base of the transistor 120*b* and the collector of the transistor 122*a*.

The negative feedback increases the stability of the balanced amplifier 80. At the same time, the feedback resistors 148*a* and 148*b* cooperate with the capacitive input impedance 123 to produce an operational effect, so that the amplifier is responsive to not only the amplitude of the input signal, but also to the rate of change of such amplitude. These components also produce a phase advancing effect which inhibits any tendency toward oscillation in the servo system.

While various values may be employed in the input and feedback networks, it may be of interest to give the following values, by way of example:

| | | |
|---|---|---|
| Capacitor 124 | microfarads | 21 |
| Resistor 126 | ohms | 18,000 |
| Resistors 148*a* and 148*b* | do | 56,000 |

The output from the balanced amplifier 80 is taken through transistors 150F and 150R which are connected as emitter followers. Thus, the bases of the transistors 150F and 150R are connected to the collectors of the respective transistors 122*a* and 122*b*. The outputs of the transistors 150F and 150R are taken from the emitters through resistors 152F and 152R. It will be seen that the collectors of the transistors 150F and 150R are connected to the ground lead 130.

Figure 12:
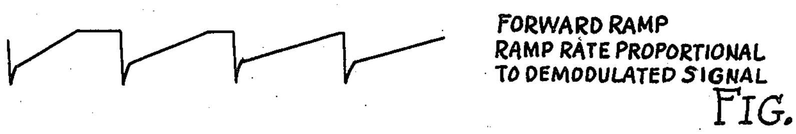
Figure 13:

The outputs of the transistor followers 150F and 150R are fed to the variable ramp generators 98F and 98R, which comprise transistors 156F and 156R, connected in Miller integrator circuits, although various other arrangements might be employed. The forward and reverse ramp generators 98F and 98R are identical, so that it will suffice to describe the forward generator 98F. As shown, the base of the transistor 156F is connected to the emitter of the transistor 150F through the resistor 152F. An integrating capacitor 158F is connected between the base and the collector of the transistor 156F. This capacitor is adapted to be discharged by the current from the transistor 150F. The rate at which the capacitor is discharged will depend upon the magnitude of the current. Thus, the slope of the ramp, shown in the wave from diagram of FIG. 12, will depend upon the magnitude of the signal from the balanced amplifier 80. FIG. 13 illustrates a similar ramp signal for the reverse ramp generator 98R.

The emitter of the transistor 156F is connected to the positive terminal 160 of a 15 volt direct current power supply, the negative terminal 162 being connected to ground. A load resistor 164F is connected between the collector of the transistor 156F and the negative terminal 166 of a 20 volt direct current power supply, the positive terminal 168 of the power supply being connected to ground.

The synchronizing pulse generator 100 supplies pulses which charge the capacitor 158F at the beginning of each half cycle of the 60 cycle alternating current. The positive pulses are supplied to the base of the transistor 156F from a line 170 through a diode 171F.

Various circuits may be employed for the synchronizing pulse generator 100. As shown, the pulse generator 100 comprises a transistor 172 having its collector connected to the pulse output line 170. A load resistor 174 is connected between the collector and ground. It will be seen that a small biasing resistor 176 is connected between the emitter and the positive terminal 134 of the 40 volt power supply. The base of the transistor 172 is supplied with full wave rectified pulses derived from the alternating current line 82, the wave form of such pulses being indicated at 178. For example, such pulses may be supplied by two diodes 180*a* and 180*b* having their cathodes connected to the base of the transistor 172 through a current limiting resistor 182. The anodes of the diodes 180*a* and 180*b* may be connected to the transformer secondary 94F and 94R. An input resistor 184 may be connected between the base of the transistor 172 and the positive power supply terminal 134. It will be seen that a biasing resistor 186 is connected between the base of the transistor 172 and ground.

With this arrangement, the transistor 172 conducts when the input signal is at and near its zero point, but is cut off as soon as the input pulses rise to any sizeable magnitude. Thus, the transistor 172 produces pulses coincident with the zero values in the alternating current wave.

The output pulses from the ramp generator 98F are fed to the trigger circuit 96F. The reverse trigger circuit 96R is the same as the forward circuit 96F, so that a description of the forward circuit will suffice.

Although the construction of the trigger circuit 96F may be varied, the illustrated trigger circuit comprises a capacitor 190F adapted to be discharged into a pulse transformer 192F through a breakdown diode 194F, often known as a Shockley diode. Thus, the breakdown diode 194F and the primary winding 196F of the pulse transformer 192F are connected in series across the capacitor 190F. The negative terminal of the capacitor 190F is connected to the negative terminal 166 of the 20 volt power supply. It will be seen that the positive terminal of the capacitor 190F is coupled to the collector of the transistor 156F by a resistor 197F. Thus, the capacitor 190F is charged through the resistor 197F by the ramp signal from the ramp generator transistor 156F. When the breakdown voltage of the diode 194F is reached, the capacitor 190F is discharged through the diode and the primary winding 196F. This generates pulses in the secondary windings 198F and 200F of the transformer 192F. The negative portions of the pulses are suppressed by diodes 202F and 204F which are connected across the secondary windings 198F and 200F.

The positive pulses from the transformer secondaries 198F and 200F are fed to the full wave control rectifier 88F. As already indicated, the full wave rectifier 88F may utilize gaseous discharge tubes, such as Thyratrons, but in this case the full wave rectifier is provided with two solid state rectifiers 206F and 208F of the control type. One side of each of the pulse transformer secondaries 198F and 200F is connected to the cathodes of the rectifiers 206F and 208F. The other side of the coil 198F is connected to the control electrode of the rectifier 206F.

Similarly, the other side of the coils 200F is connected to the control electrode of the rectifier 208F.

It will be seen that the cathodes of the control rectifiers 206F and 208F are connected to the forward field coil 84F. The anodes of the rectifiers 206F and 208F are connected to the transformer windings 94F and 94R, respectively, so as to provide full wave rectification. The arrangements of the reverse full wave rectifier 88R is the same as that of the forward rectifier 88F.

The operation of the illustrated servo system will be understood by those skilled in the art. When the tape is being pulled forward by the capstans 26, the dancer arm 42 for the forward reel 24 will remain slightly on the forward side of its null position. The output voltage from the synchro coil 106*a* will predominate over the output voltage from the coil 106*b*, so that the direct current output from the demodulator 78 will be negative. This signal is amplified by the balanced amplifier 80.

Figure 14:
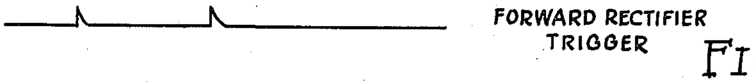
Figure 15:
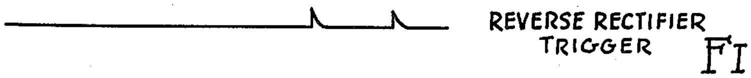
Figure 16:
Figure 17:

The amplified negative signal is supplied to the emitter follower 150F, so that negative output current is fed to the ramp generator 98F. Accordingly, the ramp generator 98F produces a ramp signal of the type shown in FIG. 12. The slope of the ramp will increase as a function of the magnitude of the signal supplied by the emitter follower 150F. The point in the cycle at which the diode 194F breaks down will be advanced as the steepness of the ramp signal is increased. Thus, the firing point of the control rectifiers 206F and 208F will be advanced with an increasing forward signal from the synchro 72. Accordingly, the forward torque of the motor will increase according to the amount by which the dancer arm 42 is displaced from its null position on the forward side thereof. The trigger circuit 192F produces pulses of the type shown in FIG. 14. The pulses of forward motor current produced by the rectifiers 206F and 208F are of the type shown in FIG. 16.

If the tape is stopped suddenly by the capstans 26, the inertia of the takeup reel will cause the tension in the tape to increase between the takeup reel and the capstans. The increased tension will pull the dancer arm 42 toward its null position and may even pull the dancer arm past the null position to the reverse side thereof. As the dancer arm approaches its null position, the torque developed by the motor will be decreased. If the dancer arm is pulled to the reverse side of the null position, the motor will develop reverse torque, so that the tape will be fed off the reel. This will effectively reduce the tension in the tape.

If the tape is pulled in reverse by the capstans 26, the tension in the tape may increase sufficiently to pull the dancer arm to the reverse side of its null position. In this case, the signal from the demodulator 78 will be positive, and the reverse ramp generator 98R will take over, so that reverse torque will be developed by the motor. Accordingly, the reel will be driven in a direction such as to pay out the tape and reduce the tension between the reel and the capstan.

It will be evident that the servo system responds quickly and effectively, because any change in the position of the dancer arm will change the torque of the motor in a direction tending to restore the normal tension in the tape. The operation of the synchro 72 does not impose any substantial delay in the response of the system, because the frequency of the carrier supplied to the synchro is very much higher than the frequency of the 60 cycle alternating current employed to energize the reel drive motors. Of course, the synchro is not subject to any substantial wear, so that the servo system will have an extremely long trouble-free life.

The balanced amplifier increases the speed of the servo system, because the output of the amplifier is proportional not only to the amplitude of the signal from the demodulator, but also the rate of change of the demodulator signal. Thus, the servo system tends to anticipate any major change in the tape tension, so that a quick corrective action is provided.

Each of the two servo systems regulates the torque of the corresponding reel motor when either forward or reverse torque is called for. Thus, the servo system provides the desired regulation of tension whether the tape is being taken up or reeled out.

Various modifications, alternative constructions and equivalents may be employed without departing from the true spirit and scope of the invention, as exemplified in the foregoing description and defined in the following claims.

We claim:

1. In a magnetic tape machine, the combination comprising a capstan for advancing the tape, a reel for taking up the tape, a direct current motor for driving said reel, a swingable arm having a tape guide thereon disposed between said capstan and said reel for receiving the tape, a spring biasing said arm in one direction for tensioning the tape, a synchro-transmitter connected to said arm and having means for developing an alternating current signal with a null at a predetermined position of said arm, means for energizing said synchro-transmitter with an alternating current carrier, a demodulator connected to the output of said synchro-transmitter for producing direct current signals of opposite polarities in response to the movement of said arm to opposite sides of said predetermined position of said arm, an amplifier connected to the output of said demodulator and having operational means responsive to both the magnitude and the rate of change of the magnitude of the signals from said demodulator, a pair of pulse generators connected to the output of said amplifier for receiving signals of opposite polarity from said amplifier, each of said pulse generators having means for generating a pulse whose phase is variable in response to variations in the amplitude of the signals from said amplifier, said motor having forward and reverse windings for producing forward and reverse torque therein, and a pair of control rectifiers coupled to the outputs of said respective pulse generators and connected to said respective forward and reverse windings for producing variable currents in said windings in response to the pulses of variable phase from said pulse generator.

2. In a servo system, the combination comprising a reversible direct current motor having forward and reverse windings for producing forward and reverse torque, a movable control member having a null position and forward and reverse positions on opposite sides of said null position, a synchro-transmitter connected to said member for producing alternating current signals of opposite phase in response to movement of said member in opposite directions from said null position, means for energizing said synchro-transmitter with an alternating current carrier, a demodulator coupled to the output of said synchro-transmitter for producing direct current signals of opposite polarities in response to said alternating current signals of opposite phase, an operational amplifier coupled to the output of said demodulator and having means responsive to both the amplitude and the rate of change of the amplitude of the direct current signals from said demodulator, a pair of ramp generators coupled to the output of said amplifier and operative in response to signals of opposite polarity therefrom, each of said ramp generators having means for producing a signal with a ramp of variable slope as a direct function of the amplitude of the signals from said amplifier, a trigger circuit coupled to the output of said ramp generator and having means for producing pulses when said ramp signal reaches a predetermined amplitude, the phase of said pulses thereby being variable as a function of the amplitude of the signals from said amplifier, and a pair of control rectifiers coupled to the outputs of said respective trigger circuits and connected to said respecitve forward and reverse windings of said motor for supplying variable currents to said windings in response to said pulses of variable phase, said currents in said forward and reverse windings thereby being variable as a function of movement of said control member in opposite direction from said null position.

3. In a servo system, the combination comprising a control member movable in forward and reverse directions from a neutral position, a synchro-transmitter connected to said control member for producing alternating current signals of opposite phases in response to movement of said member in said forward and reverse directions, a demodulator connected to the output of said synchro-transmitter for producing direct current signals of opposite polarity in response to said alternating current signals of opposite phases, forward and reverse pulse generators connected to the output of said demodulator and responsive to signals of opposite polarity therefrom, each of said pulse generators having means for producing pulses whose phase varies in accordance with the amplitude of the signals from said demodulator, a motor having forward and reverse windings for producing forward and reverse torque, and forward and reverse control rectifiers coupled to the outputs of said respective pulse generators and connected to said respective forward and reverse windings for supplying currents of variable amplitudes to said windings in response to the variation in the phase of said pulses.

4. In a tape machine, the combination comprising a reel for receiving the tape, a motor connected to said reel and having forward and reverse windings for producing forward and reverse torque, a movable member having a tape guide thereon for receiving the tape, means for biasing said movable member in one direction, the tension in the tape being effective to move the movable member in the opposite direction, a synchro-transmitter connected to said movable member for producing alternating current signals of opposite phases in response to movement of said member in opposite directions from a neutral position, a demodulator coupled to the output of said synchro-transmitter for producing direct current signals of opposite polarities in response to said alternating current signals of opposite phases, forward and reverse pulse generators coupled to the output of said demodulator and operative in response to signals of opposite polarities therefrom, each of said pulse generators having means for producing pulses whose phase is variable in response to variations of the amplitude of the signals from said demodulator, and control rectifiers coupled to the outputs of said pulse generators for producing variable currents in said forward and reverse windings in response to the variations in the phases of said pulses.

5. In a tape machine, the combination comprising a reel for receiving the tape, a motor connected to said reel, a movable member having a tape guide thereon for receiving the tape, means for biasing said movable member in one direction, the tension in the tape being effective to move the movable member in the opposite direction, transmitter means connected to said movable member for producing alternating current signals in response to movement of said member in opposite directions from a neutral position, a demodulator coupled to the output of said transmitter means for producing direct current signals in response to said alternating current signals, a pulse generator coupled to the output of said demodulator and operative in response to signals, said pulse generator having means for producing pulses whose phase is variable in response to variations of the amplitude of the signals from said demodulator, and control rectifier means coupled to the outputs of said pulse generator for producing variable currents in said motor in response to the variations in the phase of said pulses.

6. In a tape machine, the combination comprising a reel for receiving the tape, a motor connected to said reel and having forward and reverse means for producing forward and reverse torque, a movable member having a tape guide thereon for receiving the tape, means for biasing said movable member in one direction, the tension in the tape being effective to move the movable member in the opposite direction, transmitter means connected to said movable member for producing alternating current signals of opposite phases in response to movement of said member in opposite directions from a neutral position, a demodulator coupled to the output of said transmitter means for producing direct current signals of opposite polarities in response to said alternating current signals of opposite phases, forward and reverse pulse generators coupled to the output of said demodulator, each of said pulse generators having means for producing pulses whose phase is variable in response to variations of the amplitude of the signals from said demodulator, and control rectifiers coupled to the outputs of said pulse generators for supplying variable currents to said forward and reverse means in response to the variations in the phases of said pulses.

7. In a servo system, the combination comprising a control member movable from a neutral position, a synchro-transmitter connected to said control member for producing alternating current signals in response to movement of said member, a demodulator connected to the output of said synchro-transmitter for producing direct current signals in response to said alternating current signals, a pulse generator connected to the output of said demodulator and having means for producing pulses whose phase varies in accordance with the amplitude of the signals from said demodulator, a motor, and a control rectifier coupled to the output of said pulse generator and connected to said windings for supplying current of variable amplitude to said motor in response to the variation in the phase of said pulses.

8. In a tape machine, the combination comprising means for advancing the tape, a reel for taking up the tape, a direct current motor for driving said reel, a movable member having a tape guide thereon disposed adjacent said reel for receiving the tape, a means biasing said member in one direction for tensioning the tape, a synchro-transmitter connected to said member and having means for developing an alternating current signal with a null at a predetermined position of said arm, means for energizing said synchro-transmitter with an alternating current carrier, a demodulator connected to the output of said synchro-transmitter for producing direct current signals of opposite polarities in response to the movement of said member to opposite sides of said predetermined position of said arm, an amplifier connected to the output of said demodulator and having operational means responsive to both the magnitude and the rate of change of the magnitude of the signals from said demodulator, a pair of pulse generators connected to the output of said amplifier for receiving signals of opposite polarity from said amplifier, each of said pulse generators having means for generating a pulse whose phase is variable in response to variations in the amplitude of the signals from said amplifier, said motor having forward and reverse windings for producing forward and reverse torque therein, and a pair of control rectifiers coupled to the outputs of said respective pulse generators and connected to said respective forward and reverse windings for producing variable currents in said windings in response to the pulses of variable phase from said pulse generator.

9. In a servo system, the combination comprising a reversible direct current motor having forward and reverse windings for producing forward and reverse torque, a movable control member having a neutral position, transmitter means connected to said member for producing alternating current signals of opposite phase in response to movement of said member in opposite directions from said neutral position, a demodulator coupled to the output of said transmitter means for producing direct current signals of opposite polarities in response to said alternating current signals of opposite phase, forward and reverse ramp generators coupled to the output of said demodulator and operative in response to signals of opposite polarity therefrom, each of said ramp generators having means for producing a signal with a ramp of variable slope as a direct function of the amplitude of the signals from said demodulator, forward and reverse trigger circuits coupled to the outputs of said respective ramp generators and having means for producing pulses when said ramp signal reaches a predetermined amplitude, the phase of said pulses thereby being variable as a function of the amplitude of the signals from said demodulator, and forward and reverse control rectifiers coupled to the outputs of said respective trigger circuits and connected to said respective forward and reverse windings of said motor for supplying variable currents to said windings in response to said pulses of variable phase, said currents in said forward and reverse windings thereby being variable as a function of movement of said control member in opposite direction from said neutral position.

10. In a servo system, the combination comprising a control member movable in forward and reverse directions from a neutral position, transmitter means connected to said control member for producing variable signals of opposite polarities in response to movement of said member in said forward and reverse directions, forward and reverse pulse generators coupled to the output of said transmitter means and responsive to signals of opposite polarity therefrom, each of said pulse generators having means for producing pulses whose phase varies in accordance with the amplitude of the signals from said transmitter means, a motor having forward and reverse windings for producing forward and reverse torque, and forward and reverse control rectifiers coupled to the outputs of said respective pulse generators and connected to said respective forward and reverse windings for supplying currents of variable amplitudes to said windings in response to the variation in the phase of said pulses.

References Cited in the file of this patent

UNITED STATES PATENTS

| | | |
|---|---|---|
| 2,590,491 | Bendz | Mar. 25, 1952 |
| 2,701,329 | Lynch et al. | Feb. 1, 1955 |
| 2,703,380 | Fraser | Mar. 1, 1955 |
| 2,715,702 | Winchester | Aug. 16, 1955 |

OTHER REFERENCES

Lauer, Lesnick, Matson: Servo Mechanism Fundamentals, McGraw-Hill, New York, 1947, pages 29, 31 and 35.